T. A. LEGG.
FLUE PAN.
APPLICATION FILED AUG 28, 1920.

1,362,947.

Patented Dec. 21, 1920.

Inventor
Thomas A. Legg,

By

Attorney

UNITED STATES PATENT OFFICE.

THOMAS A. LEGG, OF LUMBERTON, MISSISSIPPI.

FLUE-PAN.

1,362,947.

Specification of Letters Patent.

Patented Dec. 21, 1920.

Application filed August 28, 1920. Serial No. 406,720.

*To all whom it may concern:*

Be it known that I, THOMAS A. LEGG, a citizen of the United States, residing at Lumberton, in the county of Lamar and State of Mississippi, have invented certain new and useful Improvements in Flue-Pans, of which the following is a specification.

This invention relates to flue pans and is an improvement on the construction shown and described in my prior Patent No. 1,342,918, dated June 8, 1920.

In the present invention, I have produced a flue pan of the nature shown in my prior patent wherein the side walls of the pan are inclined and wherein the tubular coupling member which receives the stove pipe is tapered or conical in shape to permit nesting of the pans in shipping.

When a number of pans constructed according to the present invention are to be packed for shipping, they may be arranged one inside of the other and thus occupy very little space. This is an important element where the pans must be shipped any considerable distance from the point of manufacture, as it greatly reduces freight charges and the ultimate cost to the user.

Figure 1:
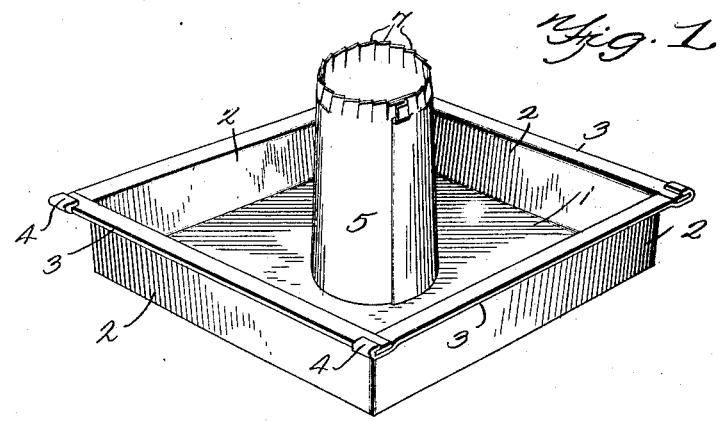

In the accompanying drawings, I have shown one embodiment of the invention. In this showing, Figure 1 is a perspective view of the improved flue pan, and Fig. 2 is a vertical sectional view showing one pan in full lines and indicating the nesting arrangement of the other pans in dotted lines.

Referring to the drawings, the reference numeral 1 designates the base of the pan. The pan is adapted to be arranged beneath the open end of a brick chimney (not shown) in the manner described in my prior patent, and is provided with side walls 2 for the purpose of spacing it from the beam or rafter to which it is to be secured. As shown in Fig. 2 of the drawings, the side walls are inclined outwardly, the bottom of the pan being smaller in circumference than the top. Each of the walls is provided with a horizontal flange 3 by which the pan is secured in position. The pan may be advantageously manufactured of sheet metal as described in my prior patent, and the corners 4 of the flanges secured in any suitable manner, such as by folding one member over the other. The bottom of the pan is provided with a centrally arranged opening adapted to receive a coupling member 5. As shown, the shape of the coupling member is a frustrum of a cone and is secured to the bottom of the flue pan by means of a seam joint 6. Any other suitable means may be employed for securing the coupling member to the pan. The upper end of the coupling member is provided with a plurality of longitudinal slits whereby a series of tabs 7 are produced. These tabs constitute a yielding flange adapted to receive the stove pipe and form a close fit therewith to prevent cinders from passing into the room.

Figure 2:
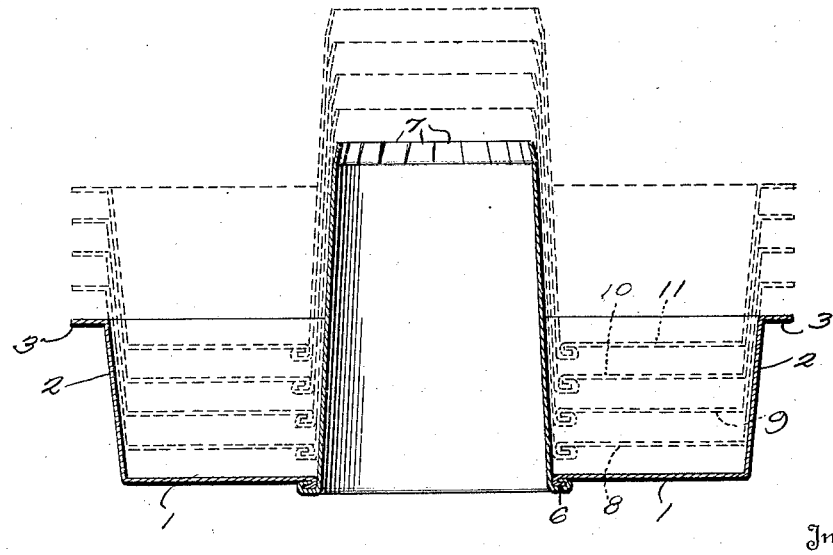

Referring to Fig. 2 of the drawings, I have illustrated in dotted lines a number of pans 8, 9, 10, and 11, arranged within the pan 1. As shown, the arrangement of a pan having a larger circumference at the top than at the bottom and the provision of a tapering coupling member permits the pans to be arranged in a nested form and thus save a great deal of space in packing.

It is to be understood, that while I have shown and described the preferred embodiment of my invention, various changes in the shape, size, and arrangement of parts may be resorted to without departing from the spirit of the invention or the scope of the subjoined claims.

Having thus described my invention, I claim:

1. A flue pan comprising a bottom having a central opening, inclined walls, securing flanges arranged on the upper ends of the walls, and a coupling member arranged in said opening, said coupling member being provided on the upper end with a resilient flange for the purpose described.

2. A flue pan comprising a bottom having a central opening, inclined walls, securing flanges arranged on the upper ends of the walls, and a tapered coupling member arranged in said opening, said tapered coupling member being provided on the upper end with a resilient flange for the purpose described.

In testimony whereof I affix my signature in the presence of two witnesses.

THOMAS A. LEGG.

Witnesses:
H. B. McINNIS,
ROBERT W. THOMPSON, Jr.